(12) United States Patent
Ohama et al.

(10) Patent No.: US 6,521,711 B1
(45) Date of Patent: *Feb. 18, 2003

(54) MULTI-PIECE SOLID GOLF BALL

(75) Inventors: Keiji Ohama, Akashi (JP); Keiji Moriyama, Akashi (JP); Kazunari Yoshida, Kasai (JP); Satoshi Iwami, Akashi (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,680

(22) Filed: Jun. 9, 2000

(30) Foreign Application Priority Data

Jun. 11, 1999 (JP) .............................. 11-165180

(51) Int. Cl.$^7$ .................. A63B 37/06; C08F 279/02
(52) U.S. Cl. .................. 525/274; 473/373; 473/374
(58) Field of Search .................. 525/274; 473/373, 473/374

(56) References Cited

U.S. PATENT DOCUMENTS

| 4,056,269 A | * | 11/1977 | Pollitt |
| 4,169,599 A | * | 10/1979 | Fujio |
| 4,483,537 A | * | 11/1984 | Hanada |
| 4,625,964 A | * | 12/1986 | Yamada |
| 4,848,770 A | * | 7/1989 | Shama |
| 5,184,828 A | * | 2/1993 | Kim |
| 5,711,723 A | * | 1/1998 | Hiraoka |
| 6,281,294 B1 | * | 8/2001 | Tanaka |

FOREIGN PATENT DOCUMENTS

| JP | A5725337 | 2/1982 |
| JP | A280068 | 3/1990 |

* cited by examiner

*Primary Examiner*—David J. Buttner
(74) *Attorney, Agent, or Firm*—Birch, Stewart, Kolasch & Birch, LLP

(57) ABSTRACT

The present invention provides a multi-piece solid golf ball having very soft and good shot feel at the time of hitting, and having high rebound characteristics and excellent flight performance, while maintaining good productivity and the like. The present invention relates to a multi-piece solid golf ball comprising a core consisting of a center and at least one layer of intermediate layer formed on the center, and a cover covering the core, wherein the intermediate layer comprises at least one layer formed from a rubber composition comprising 20 to 60 parts by weight of α,β-unsaturated carboxylic acid or metal salt thereof and 5 to 70 parts by weight of α,β-unsaturated carboxylic acid ester, based on 100 parts by weight of a base rubber.

16 Claims, 2 Drawing Sheets

MULTI-PIECE SOLID GOLF BALL

FIELD OF THE INVENTION

The present invention relates to a multi-piece solid golf ball. More particularly, it relates to a multi-piece solid golf ball having very soft and good shot feel at the time of hitting, and having high rebound characteristics and excellent flight performance, while maintaining good productivity and the like.

BACKGROUND OF THE INVENTION

Golf balls, which are commercially selling, are typically classified into thread wound golf balls and solid golf balls. In the solid golf balls, a two-piece solid golf ball composed of a core and a cover covering the core, and a multi-piece solid golf ball, such as a three-piece solid golf ball comprising an intermediate layer between the core and the cover of the two-piece solid golf ball, generally occupy the greater part of the golf ball market. The multi-piece solid golf ball has excellent flight performance and good shot feel at the time of hitting, because of accomplishing various hardness distributions as compared with the two-piece golf ball. There has been no golf ball, which has high rebound characteristics and excellent flight performance when hit by all golfers, such as golfers who swings the golf club at low head speed, golfers who swings the golf club at high head speed and the like.

In a conventional multi-piece golf ball, the intermediate layer has been typically formed from rubber material or thermoplastic resin as main component. If formed from rubber material, the rubber composition comprising high-cis polybutadiene, zinc salt of (meth)acrylic acid, peroxide curing agent and other additive typically is used as the rubber material. The zinc salt of (meth)acrylic acid acts as a co-crosslinking agent to form not only oxygen crosslink with peroxide in rubber molecular, but the other crosslink with the zinc (meth)acrylate between rubber moleculars, whereby improving flight performance and shot feel at the time of hitting of the resulting golf ball.

In the multi-piece golf ball comprising the intermediate layer, it is important that the core is soft and the intermediate layer has high hardness in order to accomplish both soft and good shot feel and excellent flight performance. However, since the thickness of the intermediate layer is typically very small, it is difficult to accomplish the sufficient hardness of the intermediate layer to impart high rebound characteristics and excellent flight performance to the resulting golf ball by using the co-crosslinking agent. There has been problem that the releasability is largely degraded, and the productivity is degraded, if increasing the amount of the co-crosslinking agent in order to heighten the hardness of the intermediate layer.

It has been proposed to use a blend of the zinc (meth) acrylate and an unsaturated carboxylic acid ester as a co-crosslinking agent in the rubber composition for a one-piece solid golf ball or a center of a multi-piece solid golf ball in order to accomplish high hardness (for example, in Japanese Patent Kokai publication Nos. 25337/1982, 80068/1990).

A composition for solid golf ball comprising 20 to 35 parts by weight of a mixture of multi-functional unsaturated ester and unsaturated carboxylic acid as a polymerization crosslinkable monomer, based on 100 parts by weight of polybutadiene, is described in Japanese Patent Kokai publication No. 25337/1982. It is also described to use the composition for an integrally molded solid golf ball (one-piece golf ball) or a center of a multi-piece solid golf ball. However, since the amount of the mixture of multi-functional unsaturated ester and unsaturated carboxylic acid in the composition is small, the molding article is soft, and sufficient rebound characteristics are not obtained. In the integrally molded solid golf ball or the center of the multi-piece solid golf ball using the composition, the surface hardness is low, and sufficient flight performance of the resulting golf ball is not obtained.

A solid golf ball comprising a core formed from a vulcanizing article of rubber composition comprising 7 to 14 parts by weight of a metal salt of unsaturated carboxylic acid, 5 to 30 parts by weight of an unsaturated carboxylic acid ester of not less than pentavalent alcohol or epoxy resin and 1 to 5 parts by weight of organic peroxide, based on 100 parts by weight of polybutadiene, is described in Japanese Patent Kokai publication No. 80068/1990. Since the amount of the metal salt of unsaturated carboxylic acid and unsaturated carboxylic acid ester is large, high hardness is obtained. However, the core is hard, and soft shot feel is not obtained. The crosslinking is not sufficiently conducted, and high rebound characteristics are not obtained, because the amount of the metal salt of unsaturated carboxylic acid is small.

There has been no golf ball, which is sufficient to accomplish the balance between shot feel at the time of hitting and flight performance. It has been required to provide the golf ball, which the flight performance and the shot feel are improved still more without the deterioration of the other performance such as the productivity.

OBJECTS OF THE INVENTION

A main object of the present invention is to provide a multi-piece solid golf ball having very soft and good shot feel at the time of hitting, and having high rebound characteristics and excellent flight performance, without the deterioration of the other performance such as the productivity.

According to the present invention, the object described above has been accomplished, in a multi-piece solid golf ball comprising a core consisting of a center and at least one layer of intermediate layer formed on the center, and a cover covering the core, by using a rubber composition comprising a specified amount of α,β-unsaturated carboxylic acid or metal salt thereof and α,β-unsaturated carboxylic acid ester in at least one layer of the intermediate layer, thereby providing a multi-piece solid golf ball having very soft and good shot feel at the time of hitting, and having high rebound characteristics and excellent flight performance, without the deterioration of the other performance such as the productivity.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein.

SUMMARY OF THE INVENTION

The present invention provides a multi-piece solid golf ball comprising a core consisting of a center and at least one layer of intermediate layer formed on the center, and a cover covering the core,
wherein the intermediate layer comprises at least one layer formed from a rubber composition comprising 20 to 60 parts by weight of α,β-unsaturated carboxylic acid or metal salt thereof and 5 to 70 parts by weight of α,β-unsaturated carboxylic acid ester, based on 100 parts by weight of a base rubber.

DETAILED DESCRIPTION OF THE INVENTION

Figure 1:
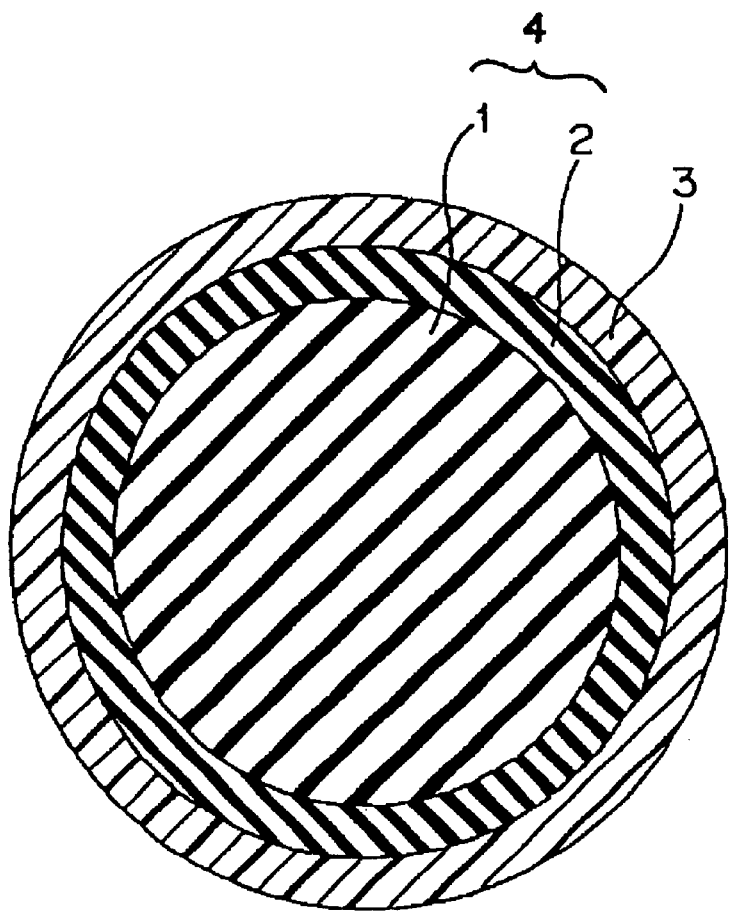
FIG. 1 is a schematic cross section illustrating one embodiment of the golf ball of the present invention.

The multi-piece solid golf ball of the present invention will be explained with reference to the accompanying drawing in detail. FIG. 1 is a schematic cross section illustrating one embodiment of the multi-piece solid golf ball of the present invention. As shown in FIG. 1, the golf ball of the present invention comprises a core 4 consisting of a center 1 and an intermediate layer 2 formed on the center 1, and a cover 3 covering the core 4. In the golf ball of the present invention, the intermediate layer 2 may have single-layer structure or multi-layer structure, which has two or more layers. However, in order to explain the golf ball of the present invention simply, a golf ball having one layer of intermediate layer 2, that is, a three-piece solid golf ball, will be used hereinafter for explanation.

The core 4, including both the center 1 and the intermediate layer 2, is obtained by press-molding a rubber composition. The rubber composition essentially contains a base rubber, a co-crosslinking agent, an organic peroxide and a filler.

The base rubber used for the core 4 of the present invention may be natural rubber or synthetic rubber, which has been conventionally used for cores of solid golf balls. Preferred is high-cis polybutadiene rubber containing a cis-1,4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be at α,β-unsaturated carboxylic acids having 3 to 8 carbon atoms (e.g. acrylic acid, methacrylic acid, etc.) or a metal salt thereof, including mono or divalent metal salts, such as zinc, magnesium, or calcium salts, or a blend of α,β-unsaturated carboxylic acid or the metal salt thereof and α,β-unsaturated carboxylic ester and the like.

The preferred co-crosslinking agent for the center 1 is zinc acrylate, because it imparts high rebound characteristics to the resulting golf ball. The amount of the co-crosslinking agent is from 10 to 45 parts by weight, preferably from 15 to 40 parts by weight, based on 100 parts by weight of the base rubber. When the amount of the co-crosslinking agent is larger than 45 parts by weight, the core is too hard, and the shot feel is poor. On the other hand, when the amount of the co-crosslinking agent is smaller than 10 parts by weight, it is required to increase an amount of the organic peroxide in order to impart a desired hardness to the core. Therefore, the rebound characteristics are degraded, which reduces the flight distance.

The preferred co-crosslinking agents for the intermediate layer 2 are magnesium methacrylate, calcium acrylate and zinc acrylate as a metal salt of α,β-unsaturated carboxylic acids. Particularly, magnesium salt is preferable as a metal salt, because it imparts high rebound characteristics and good releasability from a mold to the core. The amount of the co-crosslinking agent is from 20 to 60 parts by weight, preferably from 25 to 50 parts by weight, more preferably from 25 to 45 parts by weight, based on 100 parts by weight of the base rubber. When the amount of the co-crosslinking agent is larger than 60 parts by weight, the co-crosslinking agent is saturated, and it begins to degrade the rebound characteristics. On the other hand, when the amount of the co-crosslinking agent is smaller than 20 parts by weight, the rebound characteristics are sufficiently obtained.

The α,β-unsaturated carboxylic ester is the product formed by the reaction of the α,β-unsaturated carboxylic acid with alcohol. Examples of the α,β-unsaturated carboxylic acid include acrylic acid, methacrylic acid, ethacrylic acid, crotonic acid, sorbic acid, itaconic acid, maleic acid, fumaric acid and the like, preferred are acrylic acid and methacrylic acid. Examples of the alcohol include monovalent alcohols, such as methanol, ethanol, propanol; polyvalent alcohols, such as ethylene glycol, propylene glycol, trimethylolpropane, pentaerythritol; and the like. Preferred is polyvalent alcohols, in view of reaction efficiency and safety, such as flash point, irritant and the like. Particularly preferred are polyvalent alcohols having three or more alcohol group. Examples of α,β-unsaturated carboxylic ester used in the present invention include trimethylolpropane trimethacrylate, trimethylolpropane triacrylate, pentaerythritol tetraacrylate, di(pentaerythritol) hexaacrylate and the like. The amount of the α,β-unsaturated carboxylic ester is from 5 to 70 parts by weight, preferably from 10 to 50 parts by weight, more preferably from 10 to 45 parts by weight, based on 100 parts by weight of the base rubber. On the other hand, when the amount of the α,β-unsaturated carboxylic ester is smaller than 5 parts by weight, the rebound characteristics are degraded. When the amount of the α,β-unsaturated carboxylic ester is larger than 70 parts by weight, the amount is saturated, and the hardness and rebound characteristics are degraded. On the other hand, when the amount is smaller than 5 parts by weight, the technical effect of heightening the hardness is not sufficiently obtained, and the rebound characteristics are degraded.

It is desired that the α,β-unsaturated carboxylic ester have a molecular weight of 150 to 650, preferably 200 to 600, more preferably 250 to 600. When the molecular weight is smaller than 150, the content of the reactive functional group for the amount of the α,β-unsaturated carboxylic ester is small, and the reaction efficiency is degraded. On the other hand, when the molecular weight is larger than 650, the viscosity of the composition is high, and the productivity is degraded.

It is desired that the total amount of the α,β-unsaturated carboxylic acid or metal salt thereof and α,β-unsaturated carboxylic acid ester be 40 to 120 parts by weight, preferably 45 to 100 parts by weight, based on 100 parts by weight of the base rubber. When the total amount is smaller than 40 parts by weight, the amount of the co-crosslinking agent including the α,β-unsaturated carboxylic acid ester is too small, and the desired hardness is not obtained. On the other hand, when the total amount is larger than 120 parts by weight, it is saturated, and the hardness and rebound characteristics are degraded.

It is desired that the weight ratio (A/B) of the α,β-unsaturated carboxylic acid or metal salt thereof (A) to the α,β-unsaturated carboxylic acid ester (B) be 0.2 to 5.0, preferably 0.4 to 4.5, more preferably 0.6 to 4.0. When the weight ratio is smaller than 0.2 or larger than 5.0, the balance of the ratio of components is not accomplished, and the technical effect of improving the rebound characteristics is not sufficiently obtained.

The organic peroxide includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.2 to 5.0 parts by weight, preferably 0.5 to 4.5 parts by weight, based on 100 parts by weight of the base rubber. When the amount of the organic peroxide is smaller than 0.2 parts by weight, the core is too soft, and the rebound characteristics are degraded, which reduces the flight distance. On the other hand, when the amount of the organic peroxide is larger than 5.0 parts by weight, the amount is saturated, and the hardness and rebound characteristics are degraded.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler is from 5 to 50 parts by weight, preferably from 15 to 45 parts by weight, based on 100 parts by weight of the base rubber. When the amount of the filler is smaller than 5 parts by weight, it is difficult to adjust the weight of the resulting golf ball. On the other hand, when the amount of the filler is larger than 50 parts by weight, the weight ratio of the rubber component in the core is small, and the rebound characteristics reduce too much.

The rubber compositions for the core of the golf ball of the present invention can contain other components, which have been conventionally used for preparing the core of solid golf balls, such as antioxidant or peptizing agent, or organic sulfide compound. The organic sulfide compound includes diphenyl disulfide, bis(4-methacryloylthiophenyl) sulfide, 4,"-dibromodiphenyl sulfide and the like. If used, the amount of the organic sulfide compound is preferably 0.2 to 5.0 parts by weight, based on 100 parts by weight of the base rubber.

Figure 2:
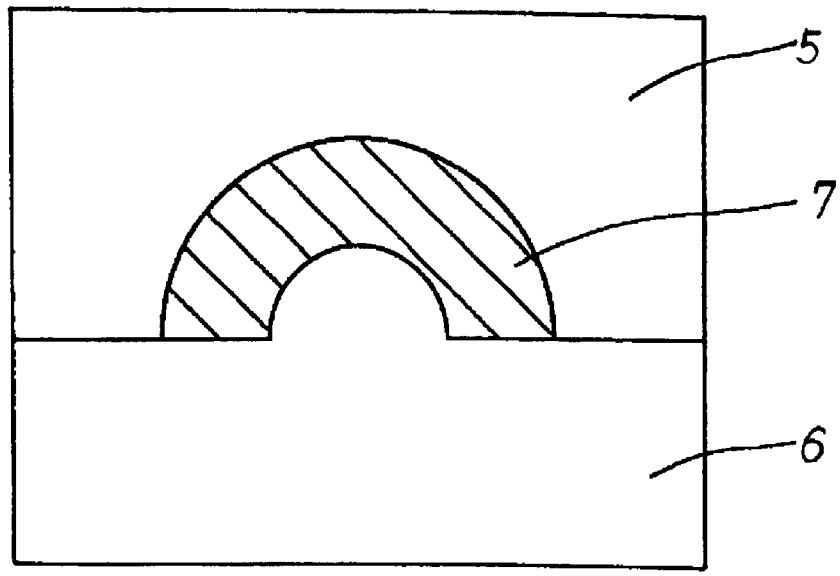
FIG. 2 is a schematic cross section illustrating one embodiment of a mold for molding an intermediate layer of the golf ball of the present invention.
Figure 3:
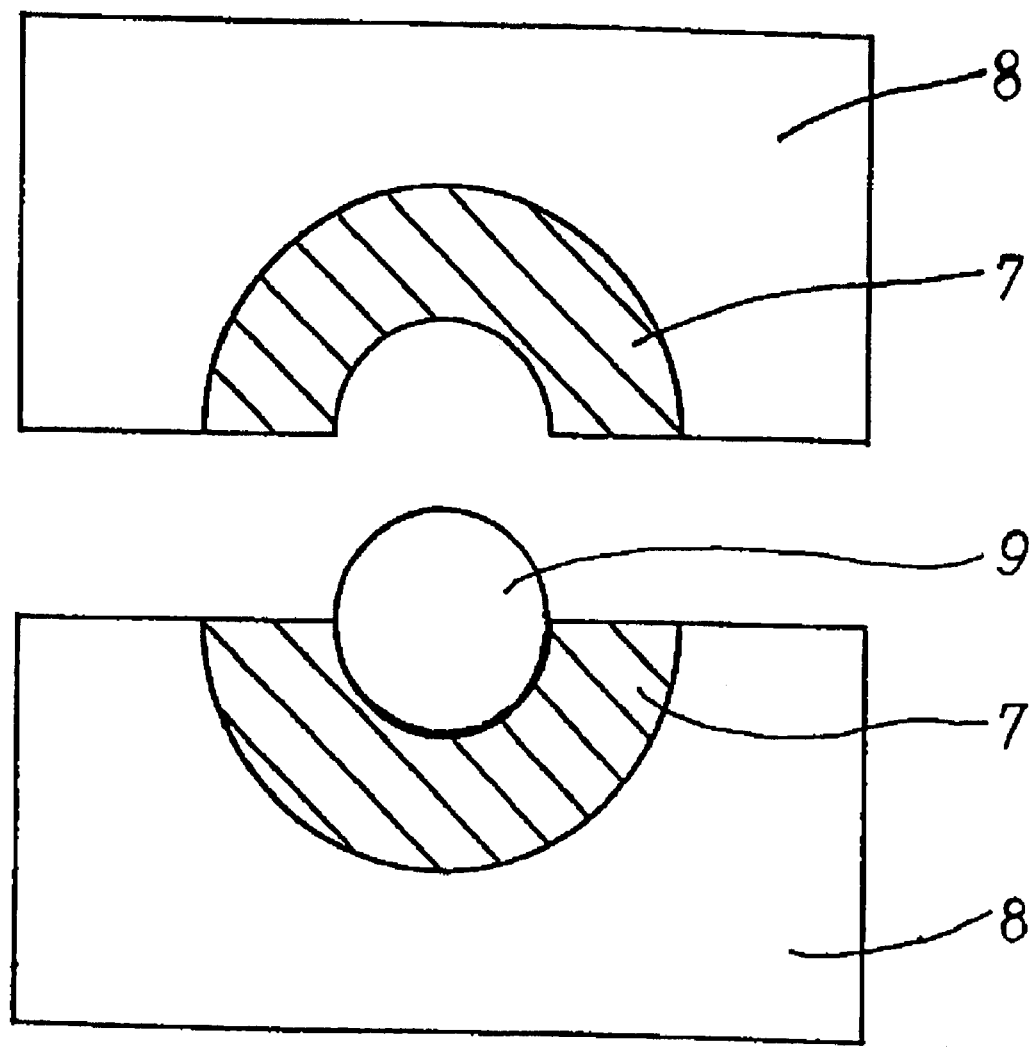
FIG. 3 is a schematic cross section illustrating one embodiment of a mold for molding a core of the golf ball of the present invention.

The process of producing the core of the golf ball of the present invention will be explained with reference to FIG. 2 and FIG. 3. FIG. 2 is a schematic cross section illustrating one embodiment of a mold for molding an intermediate layer of the golf ball of the present invention. FIG. 3 is a schematic cross section illustrating one embodiment of a mold for molding a core of the golf ball of the present invention. The rubber composition for the center is molded by using an extruder to form a cylindrical unvulcanized center. The rubber composition for the intermediate layer is then vulcanized by press-molding, for example, at 120 to 160° C. for 2 to 30 minutes using a mold having a semi-spherical cavity 5 and a male plug mold 6 having a semi-spherical convex having the same shape as the center as described in FIG. 2 to obtain a vulcanized semi-spherical half-shell 7 for the intermediate layer. The unvulcanized center 9 is covered with the two vulcanized semi-spherical half-shells 7 for the intermediate layer, and then vulcanized by integrally press-molding, for example, at 140 to 180° C. for 10 to 60 minutes in a mold 8 for molding a core, which is composed of an upper mold and a lower mold, as described in FIG. 3 to obtain the core 4. The core 4 is composed of the center 1 and the intermediate layer 2 formed on the center. In the process of producing the core of the present invention, the mold contacts with only the intermediate layer during the molding. Therefore the productivity is good by using magnesium methacrylate as a co-crosslinking agent in the rubber composition for the intermediate layer, because it imparts good releasability from a mold to the core.

In the golf ball of the present invention, it is desired that the center 1 have a surface hardness in JIS-C hardness of 65 to 90, preferably 70 to 90, more preferably 70 to 85. When the hardness is smaller than 65, the shot feel is heavy and poor, and the center is too soft, and the rebound characteristics are degraded, which reduces the flight distance. On the other hand, when the hardness is a larger than 90, the center is too hard, and the shot feel is hard and poor. In addition, the rebound characteristics are good, but the launch angle is small, which reduces the flight distance. The surface hardness of the center 1 as used herein is determined by measuring a hardness at the surface of the center, after removing the intermediate layer 2 from the core to expose the center 1.

In the golf ball of the present invention, the center 1 has a diameter of 30 to 40 mm, preferably 32 to 39.5 mm. When the diameter of the center is smaller than 30 mm, it is required to increase the thickness of the intermediate layer or the cover to a thickness more than a desired thickness. Therefore, the shot feel is hard and poor. On the other hand, when the diameter of the center is larger than 40 mm, the technical effect accomplished by the presence of the intermediate layer is not sufficiently obtained, which reduces the flight distance.

In the golf ball of the present invention, it is desired that the intermediate layer 2 have a surface hardness in JIS-C hardness of 70 to 95, preferably 75 to 95, more preferably 75 to 90. When the hardness is smaller than 70, the intermediate layer is too soft, and the rebound characteristics are degraded, which reduces the flight distance. In addition, the shot feel is heavy and poor. On the other hand, when the hardness is larger than 95, the intermediate layer is too hard, and the shot fell is poor. In addition, the deformation amount at the time of hitting is small, and the launch angle is small, which reduces the flight distance. As used herein, the term "a hardness of the intermediate layer" means the surface hardness of the core having a two-layered structure, which is formed by integrally press-molding the center and the intermediate layer.

In the present invention, it is desired that the difference (a–b) between the surface hardness in JIS-C hardness of the intermediate layer (a) and a surface hardness of the center (b) be within the range of –5 to +20, preferably –2 to +20, more preferably 0 to +15. When the hardness difference is smaller than –5, the intermediate layer is too soft. Therefore, the rebound characteristics are degraded and the spin amount at the time of hitting is large, which reduces the flight distance. On the other hand, when the hardness difference is larger than +20, the intermediate layer is too hard, and the shot fell is poor.

In the golf ball of the present invention, the intermediate layer 2 has a thickness of 0.3 to 2.0 mm, preferably 0.3 to 1.7 mm, more preferably 0.3 to 1.5 mm. When the thickness is smaller than 0.3 mm, the technical effect accomplished by the presence of the intermediate layer is not sufficiently obtained, and the launch angle is small, which reduces the flight distance. On the other hand, when the thickness is larger than 2.0 mm, the portion having high hardness, that is, the intermediate layer is too thick, and the shot feel is hard and poor. In addition, rebound characteristics are degraded. In addition, the deformation amount at the time of hitting is small, and the launch angle is small, which reduces the flight distance.

In the golf ball of the present invention, the intermediate layer 2 is formed by press-molding the rubber composition as used in the center 1, which comprises a base rubber, a co-crosslinking agent, an organic peroxide, a filler and the like, as described above. Since the intermediate layer 2, which is not formed from thermoplastic resin, such as ionomer resin, thermoplastic elastomer, diene copolymer and the like, is formed from the press-molded article of the rubber composition, the rebound characteristics are improved and the shot feel is good. Since the center 1 and the intermediate layer 2 are formed from the same vulcanized rubber composition, the adhesion between the center 1 and the intermediate layer 2 is excellent, and the durability is improved. Rubber, when compared with resin, has a little deterioration of performance at low temperature lower than room temperature as known in the art, and thus the intermediate layer of the present invention formed from the rubber has excellent rebound characteristics at low temperature.

The cover 3 is then covered on the core 4. The cover 3 of the present invention contains thermoplastic resin, particularly ionomer resin, which has been conventionally used for the cover of golf balls, as a base resin. The ionomer resin may be a copolymer of ethylene and α,β-unsaturated carboxylic acid, of which a portion of carboxylic acid groups is neutralized with metal ion, or a terpolymer of ethylene, α,β-unsaturated carboxylic acid and α,β-unsaturated carboxylic acid ester, of which a portion of carboxylic acid groups is neutralized with metal ion. Examples of the α,β-unsaturated carboxylic acid in the ionomer include acrylic acid, methacrylic acid, fumaric acid, maleic acid, crotonic acid and the like, preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes a sodium ion, a potassium ion, a lithium ion, a magnesium ion, a calcium ion, a zinc ion, a barium ion, an aluminum, a tin ion, a zirconium ion, cadmium ion, and the like. Preferred are sodium ions, zinc ions, magnesium ions and the like, in view of rebound characteristics, durability and the like.

The ionomer resin is not limited, but examples thereof will be shown by a trade name thereof. Examples of the ionomer resins, which are commercially available from Mitsui Du Pont Polychemical Co., Ltd. include Hi-milan 1555, Hi-milan 1557, Hi-milan 1605, Hi-milan 1652, Hi-milan 1702, Hi-milan 1705, Hi-milan 1706, Hi-milan 1707, Hi-milan 1855, Hi-milan 1856 and the like. Examples of the ionomer resins, which are commercially available from Du Pont Co., include Surlyn 8945, Surlyn 9945, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination.

As the materials suitably used in the cover 3 of the present invention, the above ionomer resin may be used alone, but the ionomer resin may be used in combination with at least one of thermoplastic elastomer, diene block copolymer and the like.

Examples of the thermoplastic elastomers include polyamide thermoplastic elastomer, which is commercially available from Toray Co., Ltd. under the trade name of "Pebax" (such as "Pebax 2533"); polyester thermoplastic elastomer, which is commercially available from Toray-Do Pont Co., Ltd. under the trade name of "Hytrel" (such as "Hytrel 3548", "Hytrel 4047"); polyurethane elastomer, which is commercially available from Takeda Verdishe Co., Ltd. under the trade name of "Elastoran" (such as "Elastoran ET880"); and the like.

The diene block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010") and the like.

The amount of the thermoplastic elastomer or diene block copolymer is 1 to 60 parts by weight, preferably 1 to 35 parts by weight, based on 100 parts by weight of the base resin for the cover. When the amount is smaller than 1 parts by weight, the technical effect of absorbing the impact force at the time of hitting accomplishing by using them is not sufficiently obtained. On the other hand, when the amount is larger than 60 parts by weight, the cover is too soft and the rebound characteristics are degraded, or the compatibility with the ionomer resin is degraded and the durability is degraded.

The composition for the cover 3 used in the present invention may optionally contain pigments (such as titanium dioxide, etc.) and the other additives such as a dispersant, an antioxidant, a UV absorber, a photostabilizer and a fluorescent agent or a fluorescent brightener, etc., in addition to the resin component, as long as the addition of the additives does not deteriorate the desired performance of the golf ball cover.

A method of covering on the core 4 with the cover 3 is not specifically limited, but may be a conventional method. For example, there can be used a method comprising molding the cover composition into a semi-spherical half-shell in advance, covering the core, which is covered with the intermediate layer, with the two half-shells, followed by pressure molding at 130 to 170° C. for 1 to 5 minutes, or a method comprising injection molding the cover composition directly on the core, which is covered with the core, to cover it. At the time of molding the cover, many depressions called "dimples" may be optionally formed on the surface of the golf ball. Furthermore, paint finishing or marking with a stamp may be optionally provided after the cover molded for commercial purposes.

EXAMPLES

The following Examples and Comparative Examples further illustrate the present invention in detail but are not to be construed to limit the scope of the present invention.

(i) Production of Unvulcanized Center

The rubber compositions for the center having the formulation shown in Table 1 were mixed, and then extruded to obtain cylindrical unvulcanized plugs.

TABLE 1

| Center composition | Amount (parts by weight) |
| --- | --- |
| BR-11  *1 | 100 |
| Zinc acrylate | 22 |
| Zinc oxide | 20 |
| Dicumyl peroxide | 1.0 |

(ii) Production of Vulcanized Semi-spherical Half-shell for the Intermediate Layer The rubber compositions for the intermediate layer having the formulation shown in Table 2 (Examples and Comparative Examples) and Table 3 (Comparative Examples) were mixed, and then vulcanized by press-molding at 140° C. for 5 minutes in the mold (5, 6) as described in FIG. 2 to obtain vulcanized semi-spherical half-shells 7 for the intermediate layer.

TABLE 2

| Intermediate layer composition | | Example No. | | | Comparative Example No. | |
| --- | --- | --- | --- | --- | --- | --- |
| | | 1 | 2 | 3 | 1 | 2 |
| BR-11  *1 | | 100 | 100 | 100 | 100 | 100 |
| Zinc acrylate | A | 25 | — | 15 | 25 | — |
| Magnesium methacrylate | | — | 35 | 15 | — | 30 |
| Acrylic acid ester *2 | B | 15 | 25 | 20 | — | — |
| Barium sulfate | | 20 | 22 | 21 | 20 | 22 |
| Dicumyl peroxide | | 1.0 | 1.0 | 1.0 | 1.0 | 1.0 |
| A + B | | 40 | 60 | 50 | 25 | 30 |
| A/B | | 1.7 | 1.4 | 1.5 | — | — |

TABLE 3

| Intermediate layer composition | | Comparative Example No. | | | | |
| --- | --- | --- | --- | --- | --- | --- |
| | | 3 | 4 | 5 | 6 | 7 |
| BR-11  *1 | | 100 | 100 | 100 | 100 | 100 |
| Zinc acrylate | A | 15 | 45 | 65 | — | 50 |
| Magnesium methacrylate | | — | — | — | 40 | — |
| Acrylic acid ester *2 | B | 10 | — | 25 | — | — |
| Barium sulfate | | 22 | 20 | 17 | 22 | 20 |
| Dicumyl peroxide | | 1.0 | 1.0 | 1.0 | 1.0 | 1.0 |
| A + B | | 25 | 45 | 90 | 40 | 50 |
| A/B | | 1.5 | — | 2.6 | — | — |

*1: High-cis polybutadiene (trade name "BR-18") available from JSR Co., Ltd. (Content of 1, 4-cis-polybutadiene: 96%)
*2: Pentaerythritol tetraacrylate (trade name "Lightacrylate PE-4A") available from Kyoeisha Chemical Co., Ltd., molecular weight: 352

(iii) Production of Core

The unvulcanized plugs 9 for the center produced in the step (i) were covered with the two vulcanized semi-spherical half-shells 7 for the intermediate layer produced in the step (ii), and then vulcanized by press-molding at 160° C. for 30 minutes in the mold 8 as described in FIG. 3 to obtain cores 4 having a two-layered structure. A surface hardness in JIS-C hardness of the resulting core 4 was measured. The results are shown in Table 5 (Examples and Comparative Examples) and Table 6 (Comparative Examples) as a surface hardness in JIS-C hardness of the intermediate layer (B). The surface hardness in JIS-C hardness of the center (A) was also measured, and the hardness difference (B–A) was calculated. The results are shown in the same Tables.

(iv) Preparation of Cover Compositions

The formulation materials showed in Table 4 were mixed using a kneading type twin-screw extruder to obtain pelletized cover compositions. The extrusion condition was, a screw diameter of 45 mm, a screw speed of 200 rpm, and a screw L/D of 35.

The formulation materials were heated at 150 to 260° C. at the die position of the extruder.

TABLE 4

| Cover composition | | Amount (parts by weight) |
| --- | --- | --- |
| Hi-milan 1605 | *3 | 50 |
| Hi-milan 1706 | *4 | 50 |
| Titanium dioxide | | 2 |
| Barium sulfate | | 2 |

*3: Hi-milan 1605 (trade name), ethylene-methacrylic acid copolymer ionomer resin obtained by neutralizing with sodium ion, manufactured by Mitsui Du Pont Polychemical Co., Ltd.
*4: Hi-milan 1706 (trade name), ethylene-methacrylic acid copolymer ionomer resin obtained by neutralizing with zinc ion, manufactured by Mitsui Du Pont Polychemical Co., Ltd.

Examples 1 to 3 and Comparative Examples 1 to 7

The cover composition was covered on the resulting core 4 having two-layered structure by injection molding to form a cover layer 3 having a thickness of 0.2 mm. Then, paint was applied on the surface to produce golf ball having a diameter of 42.7 mm. With respect to the resulting golf balls, the coefficient of restitution, flight distance, shot feel and releasability as productivity were measured or evaluated. The results are shown in Table 5 (Examples and Comparative Examples) and Table 6 (Comparative Examples). The test methods are as follows.

(Test Method)

(1) Surface Hardness of Center and Intermediate Layer (JIS-C)

The surface hardness of the intermediate layer is determined by measuring a JIS-C hardness at the surface of the core having a two-layered structure, which is formed by integrally press-molding the center and the intermediate layer. The surface hardness of the center is determined by measuring a JIS-C hardness at the surface of the center, after removing the intermediate layer from the core to expose the center. The JIS-C hardness was measured with a JIS-C hardness meter according to JIS K 6301.

(2) Coefficient of Restitution

A aluminum cylinder having weight of 200 g struck against the golf ball at a velocity of 45 m/second, and the velocity of the cylinder and golf ball after strike were measured. The coefficient of restitution was calculated from the velocity and the weight of the cylinder and golf ball before and after strike. The measurement was conducted by using 12 golf balls for every sample (n=12), and the average is shown as the result of the golf ball.

(3) Flight Performance

A No. 1 wood club (W#1, a driver) having metal head was mounted to a swing robot manufactured by True Temper Co. and the resulting golf ball was hit at a head speed of 45 m/second, the flight distance was measured. As the flight distance, carry that is a distance to the dropping point of the hit golf ball was measured. The measurement was conducted by using 12 golf balls for every sample (n=12), and the average is shown as the result of the golf ball.

(4) Shot Feel

The shot feel of the resulting golf ball was evaluated by 10 golfers according to practical hitting test using a No. 1 wood club (W#1, a driver). The evaluation criteria are as follows.

(Evaluation Criteria)

⊙⊙: Not less than 8 golfers out of 10 golfers felt that the golf ball has low impact force at the time of hitting, and has the rebound characteristics and good shot feel.

○: Six to 8 golfers out of 10 golfers felt that the golf ball has low impact force at the time of hitting, and has the rebound characteristics and good shot feel.

Δ: Four to 5 golfers out of 10 golfers felt that the golf ball has low impact force at the time of hitting, and has the rebound characteristics and good shot feel.

×: Not more than 3 golfers out of 10 golfers felt that the golf ball has low impact force at the time of hitting, and has the rebound characteristics and good shot feel.

(5) Releasability

The releasability means easiness of releasing the core from a mold on press-molding, and is a ratio of the core, which can not be released from the mold by hand at normal force, to the total number of the core in the mold, after coating a release agent on a mold and press-molding the core in the mold five times. The releasability from the mold is evaluated by the following evaluation criteria.

(Evaluation Criteria)

⊙⊙: 0%

○: More than 0% and not less than 5%

Δ: More than 5% and not less than 15%

×: More than 15%

TABLE 5

| Test item | Example No. | | | Comparative Example No. | |
|---|---|---|---|---|---|
| | 1 | 2 | 3 | 1 | 2 |
| Surface hardness of center b(JIS-C) | 76 | 76 | 76 | 76 | 76 |
| Surface hardness of intermediate layer a (JIS-C) | 84 | 85 | 84 | 81 | 80 |
| Hardness difference (a − b) | 8 | 9 | 8 | 5 | 4 |
| Coefficient of restitution | 101 | 102 | 101 | 100 | 99 |
| Flight distance (yard) | 237 | 238 | 238 | 235 | 232 |
| Shot feel | ⊙⊙ | ⊙⊙ | ⊙⊙ | ○ | ○ |
| Releasability | ○ | ⊙⊙ | ⊙⊙ | ○ | ⊙⊙ |

TABLE 6

| Test item | Comparative Example No. | | | | |
|---|---|---|---|---|---|
| | 3 | 4 | 5 | 6 | 7 |
| Surface hardness of center b(JIS-C) | 76 | 76 | 76 | 76 | 76 |
| Surface hardness of intermediate layer a (JIS-C) | 70 | 86 | 93 | 82 | 86 |

TABLE 6-continued

| Test item | Comparative Example No. | | | | |
|---|---|---|---|---|---|
| | 3 | 4 | 5 | 6 | 7 |
| Hardness difference (a − b) | −6 | 10 | 16 | 6 | 10 |
| Coefficient of restitution | 96 | 101 | 102 | 100 | 101 |
| Flight distance (yard) | 228 | 236 | 238 | 235 | 237 |
| Shot feel | Δ | ○ | Δ | ○ | Δ |
| Releasability | ○ | Δ | × | ○ | × |

As is apparent from the results of Tables 5 to 6, the golf balls of the present invention of Examples 1 to 3 have very soft and good shot feel at the time of hitting, have high rebound characteristics and large flight distance, and good releasability from a mold, when compared with the golf balls of Comparative Examples 1 to 7.

On the other hand, in the golf balls of Comparative Examples 1 and 2, the rebound characteristics are degraded, which reduces the flight distance, because the α,β-unsaturated carboxylic acid or metal salt thereof is only used as a co-crosslinking agent for the intermediate layer composition, and the total amount of the co-crosslinking agent (A+B) is small. The golf ball of Comparative Examples 1 using zinc acrylate as the co-crosslinking agent has poorer releasability from the mold than the golf ball of Comparative Example 2 using magnesium methacrylate as the co-crosslinking agent.

In the golf ball of Comparative Example 3, the rebound characteristics are degraded, which reduces the flight distance, because the amount of the α,β-unsaturated carboxylic acid or metal salt thereof and the total amount of the co-crosslinking agent in the intermediate layer composition are small, and the difference (a−b) between the surface hardness of the intermediate layer (a) and the surface hardness of the center (b) is small.

In the golf balls of Comparative Examples 4 and 7, the releasability from the mold is poor, because zinc acrylate is only used as the co-crosslinking agent for the intermediate layer composition. In the golf ball of Comparative Example 5, the rebound characteristics and the flight distance are large, but the releasability from the mold is very poor, because the amount of zinc acrylate as the co-crosslinking agent for the intermediate layer composition is large. In the golf ball of Comparative Example 6, the releasability from the mold is good, but the rebound characteristics are degraded, which reduces the flight distance, because magnesium methacrylate is only used as the co-crosslinking agent for the intermediate layer composition.

What is claimed is:

1. A multi-piece solid golf ball comprising a core consisting of a center and at least one layer of intermediate layer formed on the center, and a cover covering the core, wherein the intermediate layer comprises at least one layer formed from a rubber composition comprising 20 to 60 parts by weight of a magnesium salt of an α,β-unsaturated carboxylic acid and 5 to 70 parts by weight of an α,β-unsaturated carboxylic acid ester, based on 100 parts by weight of a base rubber.

2. The multi-layer solid golf ball according to claim 1, wherein the intermediate layer and the center core are composed of the same rubber composition.

3. The multi-piece solid golf ball according to claim 1, wherein the total amount of the magnesium salt of the α,β-unsaturated carboxylic acid and the α,β-unsaturated carboxylic acid ester is 40 to 120 parts by weight, based on 100 parts by weight of the base rubber.

4. The multi-piece solid golf ball according to claim 1, wherein the α,β-unsaturated carboxylic acid ester has a molecular weight of 150 to 650.

5. The multi-piece solid golf ball according to claim 1, wherein the weight ratio (A/B) of the α,β-unsaturated carboxylic acid metal salt (A) to the α,β-unsaturated carboxylic acid ester (B) is 0.2 to 5.0.

6. The multi-piece solid golf ball according to claim 1, wherein the intermediate layer has a surface hardness in JIS-C hardness (a) of 70 to 95, and the difference (a–b) between the surface hardness of the intermediate layer (a) and a surface hardness of the center (b) is within the range of −5 to +20.

7. The multi-piece solid golf ball according to claim 1, wherein the center core comprises a rubber composition having a co-crosslinking agent which comprise an α,β-unsaturated carboxylic acid having 3 to 8 carbon atoms or a metal salt thereof, or a blend of said α,β-unsaturated carboxylic acid or the metal salt thereof and an α,β-unsaturated carboxylic ester.

8. The multi-piece solid golf ball according to claim 7, wherein the co-crosslinking agent is selected from the group consisting of zinc acrylate, magnesium acrylate and calcium acrylate.

9. The multi-piece solid golf ball according to claim 7, wherein the co-crosslinking agent is zinc acrylate.

10. The multi-piece solid golf ball according to claim 1, wherein the α,β-unsaturated carboxylic acid ester is either an ester of acrylic acid or methacrylic acid.

11. The multi-piece solid golf ball according to claim 1, wherein the α,β-unsaturated carboxylic acid ester is formed from a polyvalent alcohol.

12. The multi-piece solid golf ball according to claim 1, wherein the α,β-unsaturated carboxylic acid ester is formed from a polyvalent alcohol selected from the group consisting of ethylene glycol, propylene glycol, trimethylol propane, and pentaerythritol.

13. The multi-piece solid golf ball according to claim 1, wherein the α,β-unsaturated carboxylic acid ester is a member selected from the group consisting of trimethylol propane trimethacrylate, trimethylol propane triacrylate, pentaerythritol tetraacrylate and di(pentaerythritol) hexaacrylate.

14. The multi-piece solid golf ball according to claim 1, wherein the intermediate layer comprises a 100 parts by weight of a base rubber composition and 20 to 60 parts by weight of a magnesium methacrylate as a co-crosslinking agent.

15. The multi-piece solid golf ball according to claim 1, wherein the center has a surface hardness of JIS-C 65 to 90, and the center has a diameter of 30 to 40 mm; and the intermediate layer has a surface hardness in JIS-C of 70 to 95; and the difference (a–b) between the surface hardness in JIS-C hardness of the intermediate layer (a) and the surface hardness of the center (b) is within the range of −5 to +20.

16. The multi-layer solid golf ball according to claim 1, wherein the intermediate layer has a thickness of 0.3 to 2.0 mm.

* * * * *